UNITED STATES PATENT OFFICE.

JOHN H. HETHERINGTON, OF MILWAUKEE, WISCONSIN, ASSIGNOR, BY MESNE ASSIGNMENTS, TO THE NEW PROCESS FOOD COMPANY, OF WISCONSIN.

EXTRACT OF MEAT AND METHOD OF MAKING SAME.

SPECIFICATION forming part of Letters Patent No. 554,269, dated February 11, 1896.

Application filed April 5, 1894. Serial No. 506,395. (Specimens.)

*To all whom it may concern:*

Be it known that I, JOHN H. HETHERINGTON, of Milwaukee, in the county of Milwaukee and State of Wisconsin, have invented certain new and useful Improvements in Extract of Meat and Processes of Preparing It; and I do hereby declare that the following is a full, clear, and exact description of the invention, which will enable others skilled in the art to which it pertains to make and use the same.

The object of my invention is to produce a granulated extract of meat which will retain the natural flavor and the essential nutritive properties of fresh meat, which will be readily soluble and easily digested by delicate stomachs and which can be conveniently kept for a long time without deterioration.

It consists essentially of a dry granulated extract of meat and of the process of preparing the same, as hereinafter particularly described and pointed out in the claims.

For the production of my improved extract, I take fresh meat and malt, preferably in about the proportion of twenty-five pounds of malt to seventy-five pounds of meat, and macerate them together in water at a temperature of about 120° Fahrenheit until proteids of the meat have been changed by the action of the vegetable ferments contained in the malt to peptones and rendered soluble and more readily digestible, a process requiring usually from three to four hours. The meat, from which the fat has been removed, and the malt are chopped or crushed, and sufficient water for maceration is employed to produce a liquor that can be conveniently strained. I then strain the mixture, preferably add thereto about one per cent. of chloride of sodium, and evaporate the liquid portion to dryness at a moderate temperature, say from 100° to 110° Fahrenheit, *in vacuo*. The desiccated product is granulated in any convenient manner and put up in sealed or tightly-closed bottles or packages in which it may be kept without deterioration for a great length of time. I thus produce a very nutritive, palatable, and easily-digested food in concentrated form, convenient for transportation, storage, and use.

Under the term "meat" I intend to include the flesh of fowls and fish as well as of other domestic and wild animals, and under the term "malt" I intend to include any grains which have been subjected to the usual malting processes.

I claim—

1. A dry granulated or powdered food product composed of meat, including proteids which have been converted into soluble peptones, and malt including nutritive and tonic constituents in addition to the ferments which have acted upon the meat, substantially as and for the purposes set forth.

2. The process of preparing extract of meat, which consists in macerating meat and malt together at a moderate temperature in water, then straining the mixture, evaporating the liquid portion to dryness *in vacuo*, and granulating it, substantially as and for the purposes set forth.

In testimony that I claim the foregoing as my own I affix my signature in presence of two witnesses.

JOHN H. HETHERINGTON.

Witnesses:
THOMAS CROIL,
CHAS. L. GOSS.